Feb. 18, 1969 H. KUNERT ET AL 3,427,770
SAFETY GLASS
Filed Oct. 11, 1965 Sheet 1 of 2
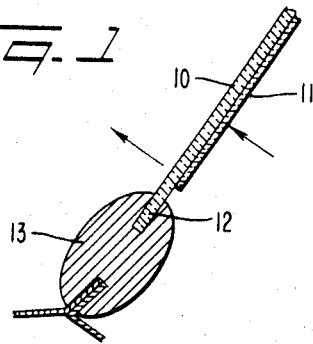
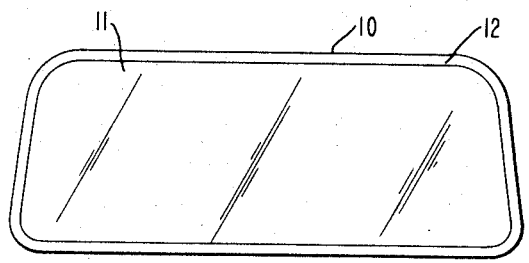
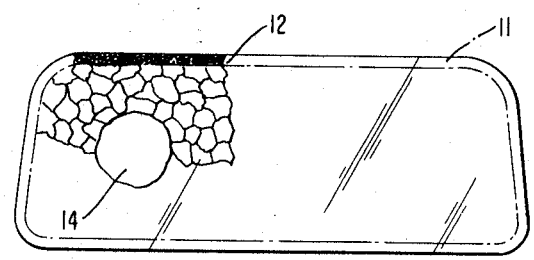
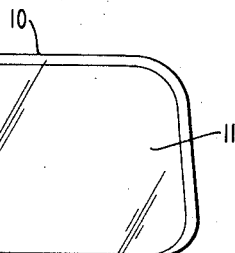
INVENTORS
HEINZ KUNERT
WILHELM BIERMANN
Bauer and Seymour
ATTORNEYS

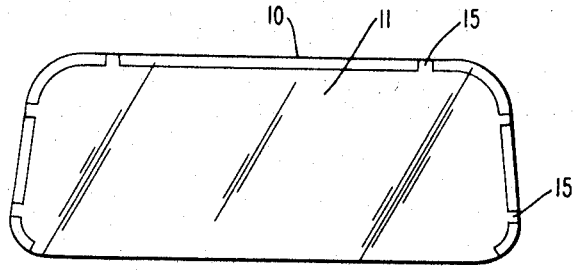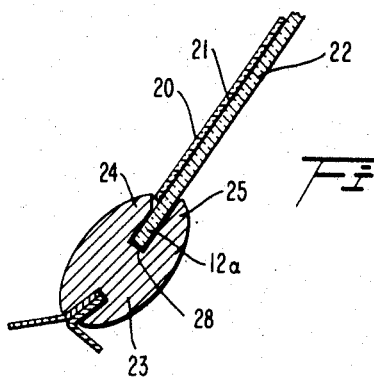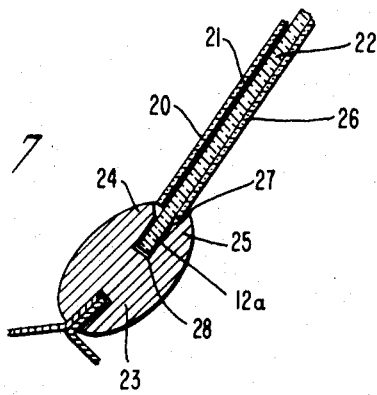

United States Patent Office 3,427,770
Patented Feb. 18, 1969

3,427,770
SAFETY GLASS
Heinz Kunert, Cologne, and Wilhelm Biermann, Aachen, Germany, assignors to Compagnie de Saint-Gobain, Neuilly-sur-Seine, France
Filed Oct. 11, 1965, Ser. No. 494,346
Claims priority, application France, Oct. 10, 1964, 991,019
U.S. Cl. 52—203    13 Claims
Int. Cl. B60j *1/02;* E06b *3/02;* C03b *27/00*

The present invention relates to safety glass for windows and particularly to safety glass for automobile windshields.

At present safety glass windows, such as used for automobile windshields, are either sheets of tempered glass or laminated sandwiches composed of two sheets of glass with a pliable plastic sheet bonded between.

Tempered glass sheets, which have internal stresses created therein, have the advantage that when they are broken they break into fragments which have blunt edges and which therefore rarely cause serious wounds. A disadvantage is that when they shatter they tend to obscure visibility. On the other hand, if a vehicle with a tempered glass windshield is travelling at high speed and the windshield is struck, by a piece of flying gravel for example, sufficiently hard to shatter the glass, the pressure of the wind is apt to cause the shattered glass to collapse and, while the pieces of tempered glass would not cut the driver, the shower of fragments and the sudden force of the wind in the driver's face could sufficiently distract him to cause an accident.

Laminated safety glass, comprising two sheets of untempered glass with a sheet of pliable plastic material between has the advantage of providing good visibility even though shattered. But if the glass is broken, the splinters are sharp and can cause dangerous lacerations. In an accident, the impact of the head of the driver or a passenger against the laminated glass can break the glass, inflicting severe cuts.

Another disadvantage of laminated safety glass windshield is caused by delay at the impact of the head of a person dashed against it. When a person's head strikes such a windshield, application of the stress on the skull may endure for more than several milliseconds before the window gives way, transmitting the stress to the spinal column and breaking the spine.

It has been proposed to secure the laminated safety glass windshield by a release mechanism, so that it can be ejected by impact, but such arrangements, aside from their complexity and risk of malfunction, tend to release when the brakes are applied quickly.

In the case of tempered glass, which breaks almost instantly into small fragments on impact, no appreciable force is transmitted to the frame, and the stress applied to a person's skull at the point of impact stays within acceptable limits of duration and intensity.

It is an object of the present invention to eliminate these disadvantages of the known types of windshields.

The present invention provides safety glass for windows, particularly for automobile windshields, comprising a sheet of tempered or otherwise strengthened glass to which is bonded a second sheet of transparent material, the tempered glass having a border which extends beyond the second sheet around at least a part of its periphery, the window being mounted in a frame which grips the edge of the strengthened glass, the sheet of transparent material being sufficiently rigid to prevent the collapse of the shattered tempered glass, as by the force of wind if, the window is shattered.

When a safety glass window of the present invention is struck by the head of a person, as in an automobile accident, the fracturing of the tempered glass spreads rapidly from the point of impact up to the edges of the glass and the second sheet of more rigid material is therefore instantly freed and offers only trifling resistance to impact.

When the sheet of tempered glass is disposed outside and this sheet of tempered glass is shattered, as by flying gravel from the road, the inside sheet prevents collapse of the tempered sheet.

In a preferred form for automobile windshields the tempered sheet would be provided in a known manner with a lightly tempered area which would not shatter in such small pieces as the remainder of the sheet, providing the driver with enough visibility to guide the car safely.

According to another form for windshields the tempered sheet is so tempered in the whole middle area as to break into fragments large enough to guarantee good visibility.

In any case the border of the tempered glass should be so high strengthened that the fragments at the borders are as small as possible. The smaller the fragments at the border the better the windshield is freed and the more reduced is the danger of injury from fragments sticking fast in the frame.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIGURE 1 is a vertical section through a portion of a glazing according to the invention;

FIGURE 2 is a front elevation of an automobile windshield in accordance with the invention;

FIGURE 3 is an elevation showing the fragmentation pattern of tempered glass sheet of which the edge of the tempered glass sheet is highly tempered to shatter into tiny pieces, an adjacent portion being less highly tempered, and an area in the line of vision of the driver being lightly tempered to permit the driver to see if breakage occurs;

FIGURE 4 is a front elevation of a variation;

FIGURE 5 is a front elevation of another variation;

FIGURE 6 is a vertical section through another from of glazing in accordance with the invention; and FIGURE 7 is a section similar to FIGURE 6 illustrating a modification of the glazing of FIGURE 6.

The safety glass for windows in accordance with the invention is particularly adapted for automobile windows, and particularly windshields, and is described hereinafter with respect to automobile windshields, by way of illustration and not limitation.

Referring now to the drawings, the safety glass window of this invention comprises generally a sheet 10 of tempered glass to which is bonded a sheet 11 of transparent material that is sufficiently rigid to prevent collapse of the outside sheet if the outside sheet is shattered. In the embodiment of the invention illustrated in FIGURES 1, 2 and 3, the outside sheet 10 of tempered glass has a border 12 which extends beyond the periphery of the inside sheet 11 on all sides and is adapted to be gripped by a frame 13 around the edge of the window. Thus as seen in FIGURE 1, the border 12 of tempered sheet 10 is held by the frame 13, but the edge 14 of the inside sheet 11 is not.

In the embodiment of FIGURES 1, 2 and 3 the inside sheet 11 may be a sheet of untempered glass bonded to the outside sheet 10 of tempered glass by an intermediate sheet of polyvinyl butyral bonded between the sheets 10 and 11 by heat and pressure in a manner well known in the art.

The inside sheet can also be a relatively thin sheet of chemically strengthened glass which offers good flexibility, so that the danger of breakage of the inner sheet by impact of the head of a passenger is reduced.

Alternatively, the inside, untempered sheet may be a sheet of plastic material, for example a sheet of polycarbonate, polyacrylate, cellulose acetate, polyester, polyvinyl chloride or other suitable plastic material.

The sheet of plastic material can be bonded to the sheet of strengthened glass by resins, as for example, polyacrylate, polyurethane, epoxy, polyester resins dissolved in styrol, and silicone rubber.

Referring now to FIGURES 1 and 3, the border 12 is more highly tempered than the rest of the sheet 10 in order to fracture into very small pieces which facilitate the ejection of the window from the frame 12 in the direction of arrow A when the glass breaks by impact. The inside sheet 11 holds the main portion of the window together, and the fine fragmentation of the portion of the border 12 between the frame 13 and edge 14 of the inside sheet 11 frees the window to be pushed easily out of the frame.

If the tempered sheet 10 is shattered by an object, the inside sheet 11 prevents the shattered glass from collapsing, as by force of wind, if the vehicle is travelling at high speed. The portion of the tempered sheet 10 in front of the driver is preferably only lightly tempered so as to leave an area, indicated at 14a, relatively free of fracture lines to preserve an area of visibility for the driver.

In the embodiment shown in FIGURE 4, the inside sheet 11 is pliable plastic, such as polycarbonate, which extends to the bottom edge of the outside tempered glass sheet 10, being secured in the bottom of the frame 13 with the adjacent portion of the outside tempered sheet. As shown, the other edges of the inside sheet 11 do not extend to the adjacent edges of the outside sheet 10 and are not gripped by the frame. Thus, on impact from the inside, the outside sheet 10 shatters, as previously described, the borders 12 of the outside sheet 10 are freed from the frame, and the inside pliable sheet 11 is pushed outward, bending down along a fold-line where the bottom edge is gripped by the frame 13.

The embodiment of FIGURE 5 is similar to the embodiment of FIGURE 4, except that, in addition to the bottom edge, the other edges of the inside pliable plastic sheet 11 have tabs 15 at spaced intervals extending to the edges of the outside tempered sheet 10 to be gripped by a surrounding frame 13. The tabs 15 are preferably not adhered to the outside sheet 10 so that they readily become disengaged from the frame 13 when impact is sufficient to shatter the sheet 10.

The tabs 15 can be provided between their inner edges with rupturing lines, that is lines along which the plastic material is weakened so that it ruptures as soon as it is under load.

The embodiment shown in FIGURE 5, may also include a sheet of untempered glass on the inside bonded to the inside plastic sheet 11, in which case the peripheral edges of outside sheet 10 and the bottom edge and tabs 15 of the inside plastic sheet 11 would extend beyond the periphery of the innermost untempered sheet. In other words, the edges of the untempered glass sheet would not be restrained at any point by the frame.

In the windshields, in accordance with the invention as described above, the release from the frame of the inside supporting sheet 11 is effected rapidly by the high speed at which the tempered sheet shatters on impact. The tempered glass sheet holds an important amount of potential energy which is released when the sheet is ruptured by impact. The energy is released rapidly over the entire sheet and there is no danger that the energy would be too weak to rupture the glass at the edges or would be delayed in being transmitted to the edges, as in the case of a shock wave.

Another form of windshield embodying the invention is shown in FIGURE 6, in which a sheet 20 of untempered glass, such as silicate glass of a usual composition, is bonded outside a sheet 22 of tempered glass by an intermediate sheet 21 of suitable pliable plastic such as polyvinyl butyral. The three sheets are bonded together by the application of heat and pressure in a known manner. As in the embodiments previously described, the border 12a of the tempered glass sheet 22 extends beyond the edges of the untempered glass sheet 20 and plastic sheet 21 and only the border of the tempered glass sheet 22 is secured in a supporting frame. The border 12a is received in a groove 28 of a frame element 23, which is preferably made of rubber. At the outer side of the windshield the frame element 23 has a lip portion 24 which overlays the border 12a to an extent no greater than the width of the border so as to extend to, but not cover, the free edges of the untempered glass sheet 20 and plastic sheet 21. At the inside of the windshield a lip 25 overlays the border to a greater extent than the lip 24 so as to overlap the corresponding position of the edges of the outer sheets 21 and 20, looked at from inside the windshield, adjacent the interior tempered glass sheet 22. Thus, when impact on the windshield frees it from the frame by breaking the border 12a of the tempered glass sheet, in the manner previously described, the windshield is free to be ejected forward, but the inside lip 25, by overlapping the position of the edges of the interior plastic sheet 21 and outer glass sheet 20, prevents the windshield from falling or being pushed inward.

With the windshield structure of FIGURE 6 shattering impact on the outward sheet 20 of untempered glass, as by a piece of flying gravel, shatters it in a limited area around the point of impact, in the manner of the usual form of laminated safety glass. If, however, the impact is from the inside, as by a passenger being thrown against the windshield in an accident, the interior tempered glass sheet 22 shatters over its entire area, releasing the windshield to be ejected outward as previously explained.

The same frame structure shown in FIGURE 6 may also be used to advantage in combination with the windshield structures described above with reference to FIGURES 1–5.

FIGURE 7 shows a modification of the windshield of FIGURE 6 in which a plastic sheet 26 is bonded to the tempered glass sheet 22 at the inside of the windshield. As shown, the interior plastic sheet 26 is coextensive with the outer untempered glass sheet 20 and plastic sheet 21 so as to impede ejection of the windshield outward from the frame. An edge portion 27 extends under the lip 25 of the frame element 23 at the inside of the windshield. The interior plastic sheet 26 thus shields the passengers from contact with fragments of shattered glass and eliminates danger of their being cut if they strike the windshield in an accident.

As many apparently widely different embodiments of the present invention may be made without departing from the spirit and scope thereof, it is to be understood that the invention is not limited to the specific embodiments.

What is claimed is:

1. A window comprising a first sheet of tempered glass bonded to a second sheet of untempered transparent material and of smaller size than said first sheet, said sheets being secured together in surface-to-surface relation to leave a border of said first sheet which extends beyond the periphery of said second sheet and is adapted to be gripped by a frame, the said border being highly tempered and frangible into small pieces.

2. The window of claim 1, said sheets being generally rectangular in shape, one edge of said second sheet substantially coinciding with the corresponding edge of said first sheet.

3. The window of claim 1 in which said second sheet has peripherally-spaced tabs each extending to the edge of said first sheet at a plurality of locations spaced along the periphery of said first sheet.

4. The window of claim 1 in which said second sheet is glass, the two sheets being bonded together by an interlayer of transparent adhesive.

5. The window of claim 1 in combination with a windshield frame which holds the border of the tempered sheet along a peripheral area thereof which is outside of the periphery of the second sheet.

6. The window according to claim 1, said second sheet being glass.

7. A window in the form of a sandwich comprising a first sheet of tempered glass and a second sheet of untempered glass with a third sheet of transparent pliable resin plastic material between and bonded to said first and second sheets, said first sheet having a highly frangible border which extends beyond the peripheries of said second and third sheet and which is adapted to be gripped by a frame.

8. A window according to claim 5 in which said frame is channeled in cross section and overlays said border over the surface thereof contiguous to said second sheet, to an extent no greater than the width of said border and overlies said border, on the surface thereof remote from said second sheet, to an extent greater than the width of said border.

9. The window of claim 7 in combination with a windshield frame channeled in cross section and which holds the border of said first sheet around the periphery of said second sheet, said frame overlying the surface of said border contiguous to said second sheet, to an extent no greater than the width of said border, said frame overlying the surface of said first sheet remote from said second sheet, along the periphery of said first sheet, to a distance greater than the width of said border.

10. The window and frame combination of claim 8 including a third sheet of transparent resin plastic material bonded to the inner side of said first sheet, said second sheet being bonded to the outer side of said first sheet, said third sheet being dimensioned and emplaced so that said border of said first sheet extends beyond the periphery of said third sheet.

11. In a window for an automotive vehicle, a first sheet of tempered glass having a regular geometrical shape, and a second sheet of untempered transparent material of like shape and smaller in area than said first sheet, said sheets being bonded together to leave exposed a border area of said first sheet, said border area being more highly strengthened and more frangible than interior portions of the sheet.

12. The window of claim 11, said border area being more highly tempered than the remaining area of said first sheet.

13. The window of claim 12, said first sheet being only lightly tempered over a limited area through which the operator of the automotive vehicle looks in operation thereof.

References Cited

UNITED STATES PATENTS

| | | | |
|---|---|---|---|
| 3,363,936 | 1/1968 | Baker | 65—115 X |
| 3,375,626 | 4/1968 | Grotefeld et al. | 52—208 |
| 2,808,355 | 10/1957 | Christie et al. | 52—208 |
| 2,866,299 | 12/1958 | Long | 65—115 |
| 2,945,268 | 7/1960 | Takenaka et al. | 52—716 X |
| 2,989,787 | 6/1961 | Smith | 52—208 X |
| 3,009,845 | 11/1961 | Wiser | 52—115 |
| 3,174,840 | 3/1965 | Long | 65—115 |
| 3,186,815 | 6/1965 | Jochim | 65—115 |

DAVID J. WILLIAMOWSKY, *Primary Examiner.*

D. L. TAYLOR, *Assistant Examiner.*

U.S. Cl. X.R.

65—115; 296—84; 52—309